US008054172B2

(12) United States Patent
Jung et al.

(10) Patent No.: US 8,054,172 B2
(45) Date of Patent: Nov. 8, 2011

(54) APPARATUS WITH RECONFIGURATION FUNCTION AND SIGNAL GATHERING FUNCTION

(75) Inventors: Eui Suk Jung, Daejeon (KR); Tae Yeon Kim, Daejeon (KR); Kang Bok Lee, Daejeon (KR); Jea Hoon Yu, Daejeon (KR); Byoung Whi Kim, Daejeon (KR)

(73) Assignee: Electronics and Telecommunications Research Institute (KR)

( * ) Notice: Subject to any disclaimer, the term of this patent is extended or adjusted under 35 U.S.C. 154(b) by 382 days.

(21) Appl. No.: 12/316,516

(22) Filed: Dec. 12, 2008

(65) Prior Publication Data

US 2009/0153320 A1 Jun. 18, 2009

(30) Foreign Application Priority Data

Dec. 18, 2007 (KR) ........................ 10-2007-0133780

(51) Int. Cl.
*G08B 29/00* (2006.01)
(52) U.S. Cl. ................... 340/506; 340/511; 340/538.15; 340/3.1
(58) Field of Classification Search .................. 340/506, 340/511, 517, 521, 538.15, 3.1, 310.11, 310.16
See application file for complete search history.

(56) References Cited

U.S. PATENT DOCUMENTS

| 5,400,246 A | * | 3/1995 | Wilson et al. .................. 700/17 |
| 5,768,152 A | | 6/1998 | Battaline et al. |
| 6,531,965 B1 | | 3/2003 | Kaiser et al. |

FOREIGN PATENT DOCUMENTS

| JP | 2007-228430 A | 6/2007 |
| KR | 10-0192636 B1 | 1/1999 |
| KR | 10-2005-0024896 A | 3/2005 |
| KR | 10-0704599 B1 | 4/2007 |

OTHER PUBLICATIONS

Yang, Choong-Reol, et al., "Design and Development of an Alarm Gathering Interface Equipment for ATM Switching System," ATM, (2000) pp. 1845-1857.

* cited by examiner

*Primary Examiner* — Daryl Pope
(74) *Attorney, Agent, or Firm* — Blakely, Sokoloff, Taylor & Zafman

(57) ABSTRACT

The present invention relates to an apparatus with reconfiguration function and signal gathering function. The apparatus with reconfiguration function and signal gathering function according to the present invention comprises a signal gathering unit which gathers at least one alarm digital alarm signal, an alarm signal address setting unit where the address of the alarm signal gathering unit is setup; and an alarm signal collection controller which outputs the at least one digital alarm signal through serial bus. Therefore, address is allocated to a plurality of digital signals and thus the number of necessary components decreases and the embodiment area decreases, as well.

14 Claims, 5 Drawing Sheets

APPARATUS WITH RECONFIGURATION FUNCTION AND SIGNAL GATHERING FUNCTION

CROSS-REFERENCE TO RELATED APPLICATION

This application claims the benefit of Korean Application No. 10-2007-0133780, filed on Dec. 18, 2007 in the Korean Intellectual Property Office, the disclosure of which is incorporated herein by reference.

BACKGROUND OF THE INVENTION

1. Field of the invention

The present invention relates to apparatus for digital alarm signal gathering and reconfiguration signal transmission in a communication system which has a function of gathering digital alarm signal which is needed for checking the state inside of the system and allocating reference address to such component as PLD (Programmable Logic Device) which needs a reconfiguration function.

The present invention was supported by the IT R&D program of Ministry of Information and Communication (MIC) and Institute for Information Technology Advancement (IITA) [Project reference number: 2007-S-014-01, Title of the Project: Metro-Access Integrated Optical Network Technology].

2. Description of the Related Art

Generally, when detecting the occurrence of digital alarm signals, an alarm signal gathering apparatus gathers and transmits the digital alarm signals to an integrated controller through a parallel bus.

In case the digital alarm signals which are to be collected outnumber the digital alarm signals which can be gathered by the alarm signal gathering apparatus, a plurality of alarm signal gathering apparatuses are connected to a single parallel bus.

FIG. 1 shows a block-diagram which illustrates the constitution of a general digital alarm signal gathering apparatus.

Referring to FIG. 1, in case digital alarm signal 1 exists, the digital alarm signal gathering apparatus 5 gathers and transmits the digital alarm signal to an integrated controller (not shown in the figure) through a parallel bus 10.

FIG. 2 shows a block-diagram which illustrates the constitution of general digital alarm signal gathering apparatus in case the 1st to the nth digital alarm signals exist.

Referring to FIG. 2, in case the 1st to the nth digital alarm signals 15 exist, an address decoding gathering apparatus 20 collects the 1st to the nth digital alarm signals 15a, 15b, . . . 15n according to its respective address which is allocated to the 1st to the nth digital alarm signals, respectively, and transmits them to an integrated controller (not shown in the figure) through a parallel bus 10.

In case the digital alarm signals 15 which are to be collected outnumber the digital alarm signals which can be gathered by the address decoding gathering apparatus 20, a plurality of address decoding gathering apparatuses may be connected to a single parallel bus. However, as compared with a serial bus connection structure where a single bus is serially connected to a plurality of decoding gathering apparatuses 20 so that single input and single output may be transmitted to the decoding gathering apparatuses, in a parallel bus connection structure where a single bus is parallel connected to a plurality of decoding gathering apparatuses 20 so that input and output to the decoding gathering apparatuses may be shared, signal integrity of the parallel data transmission line has to be secured in the course of circuit design or printed circuit board design for the sharing of a single bus due to limited electrical drive strength, the number of components wholly needed increases because the components related to the parallel bus buffering are to be added, and thus the necessary area is to be increased. Further, a difficulty follows that gathering software is to be additionally developed for the respective address decoding gathering apparatus 20.

Still further, to reconfigure the components such as reconfigurable and internally modifiable PLD (Programmable Logic Device) or FPGA (Field Programmable Gate Array) in a unit of the blocks or modules during the operation of the communication system, such inconvenience takes place as entire system is to be put to stop or the corresponding blocks or modules are to be pulled out and reconfigured in another working place.

SUMMARY OF THE INVENTION

An aspect of the present invention provides an apparatus with a reconfiguration function and a signal gathering function, which has a function of collecting digital alarm signal by use of the serial bus and wherein blocks or modules such as PLD (Programmable Logic Device) or FPGA (Field Programmable Gate Array) are reconfigurable during the operation of the system which need reconfiguration.

According to an exemplary embodiment of the present invention, an exemplary apparatus with the reconfiguration function and signal collection function includes an alarm signal gathering unit which gathers at least one digital alarm signal, a alarm signal address setting unit where the address of the alarm signal gathering unit is set up; and an alarm signal collection controller which outputs the collected at least one digital alarm signal through a serial bus.

According to an exemplary embodiment of the present invention, an exemplary apparatus with the reconfiguration function and signal collection function includes a reconfiguration address setting unit where at least one address of reconfigurable component is set up, and a reconfiguration controller which outputs a reconfiguration processing result of the reconfigurable component through the serial bus.

According to an exemplary embodiment of the present invention, an exemplary apparatus with the reconfiguration function and signal collection function is an apparatus with reconfiguration function and signal gathering function which gathers and transmits at least one digital alarm signal, including a least one alarm signal collection unit which collects at least one digital alarm signal, at least one reconfiguration unit which is connected with the alarm signal collection unit by a serial bus, including at least one reconfigurable component, and an integrated controller which is connected with the alarm signal collection unit and the reconfiguration unit by the serial bus, and outputs at least one address of the alarm signal collection unit and the reconfiguration unit through the serial bus, so that the at least one digital alarm signal of the alarm signal collection unit is inputted thereto whose address is identical with the outputted address, or transmits the reconfiguration data from the reconfiguration unit to the at least one reconfigurable components so that a reconfiguration processing result is inputted thereto.

According to an exemplary embodiment of the present invention, an exemplary controlling method of the apparatus with reconfiguration function and signal gathering function which gathers and transmits at least one digital alarm signal is controlling method of the apparatus with reconfiguration function and signal gathering function which gathers and transmits at least one digital alarm signal comprising a step where at least one address of the alarms signal collection unit and the reconfiguration unit is inputted through serial bus, a step where the inputted address is compared with the address of the alarm signal collection unit, and a step where at least one digital alarm signal of the alarm signal collection unit, whose address is identical with the inputted address after the comparison, is outputted through the serial bus.

BRIEF DESCRIPTION OF THE DRAWINGS

The present invention will become more fully understood from the detailed description given herein below and the accompanying drawings, which are given by illustration only, and thus are not limitative of the present invention, and wherein.

DETAILED DESCRIPTION OF THE PREFERRED EMBODIMENTS

Hereinafter, the present invention is described in detail with reference to the accompanying drawings.

Figure 1:
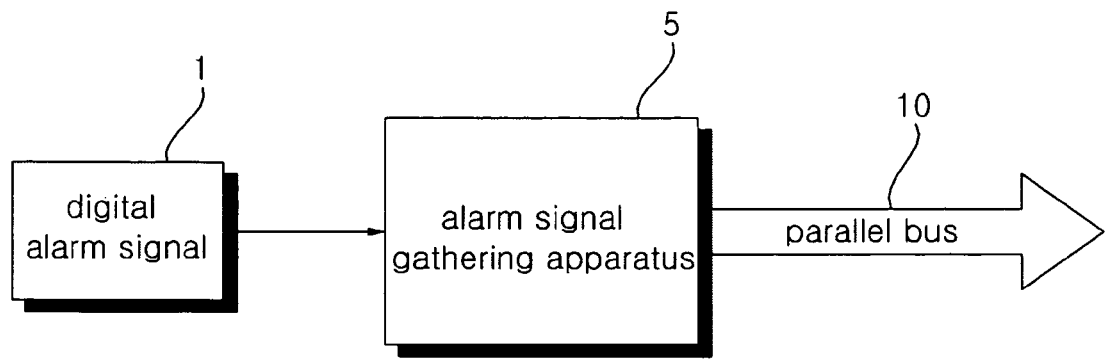
FIG. 1 shows a block-diagram which illustrates the constitution of general digital alarm signal gathering apparatus.
Figure 2:
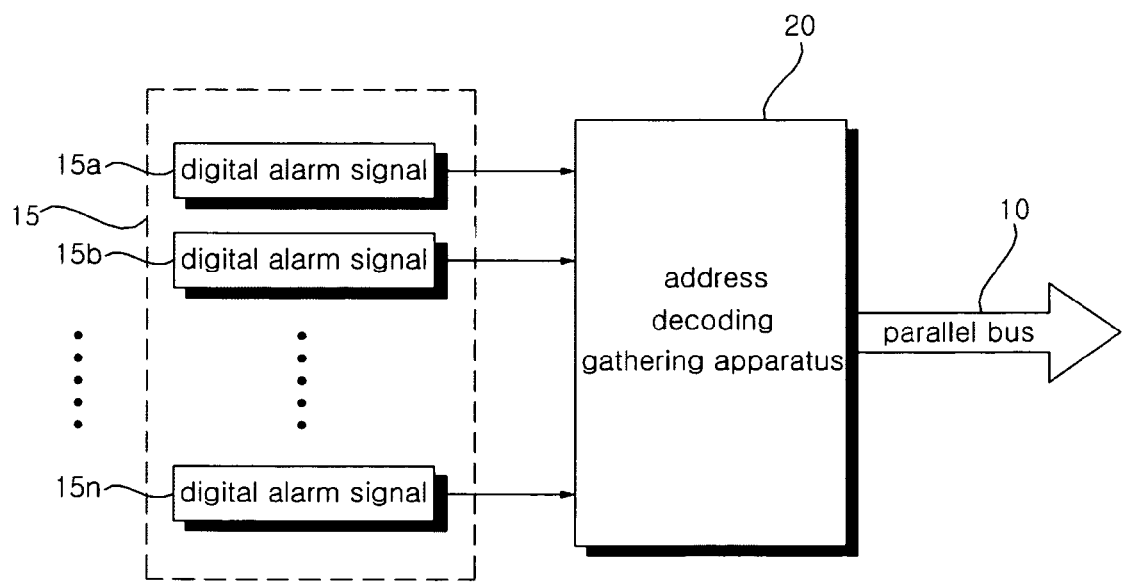
FIG. 2 shows a block-diagram which illustrates the constitution of general digital alarm signal gathering apparatus in case the 1st to the nth digital alarm signals exist.
Figure 3:
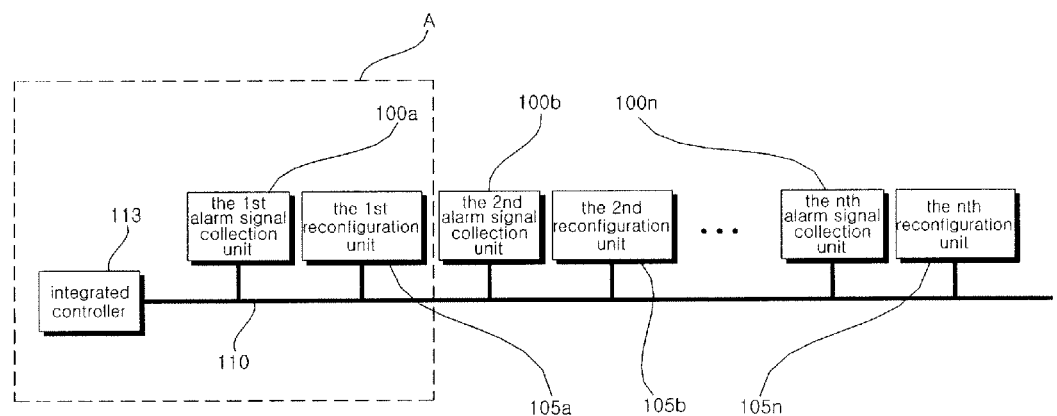
FIG. 3 shows a block-diagram which illustrates the constitution the apparatus with reconfiguration function and signal gathering function using serial bus according to one embodiment of the present invention.

FIG. 3 shows a block-diagram which illustrates the constitution of an apparatus with reconfiguration function and signal gathering function using a serial bus according to one embodiment of the present invention.

Referring to FIG. 3, the apparatus with reconfiguration function and signal gathering function using serial bus according to the present invention includes the 1st to the nth alarm signal collecting units 100a, 100b, . . . , and 100n, the 1st to the nth reconfiguration units 105a, 105b, . . . , and 105n, and an integrated controller 113.

The integrated controller 113 is connected with the 1st to the nth alarm signal collecting units 100a, 100b, . . . , and 100n, the 1st to the nth reconfiguration units 105a, 105b, . . . , and 105n through serial bus 110 which sends and receives data, thus being able to communicate with the 1st to the nth alarm signal gathering units 100a, 100b, . . . , and 100n, the 1st to the nth reconfiguration units 105a, 105b, . . . , and 105n.

The 1st to the nth alarm signal collecting units 100a, 100b, . . . , and 100n, the 1st to the nth reconfiguration units 105a, 105b, . . . , and 105n have their respective addresses, and are connected with serial bus 110 such that bus clock and word of command signal are shared, wherein the serial output data from the 1st alarm signal collecting unit 100 is connected to the serial output input signal of the 1st reconfiguration unit 105, and thus the connection of the serial bus can be simply extended.

The remaining 2nd to the nth alarm signal collecting units 100b, . . . , and 100n, the 2nd to the nth reconfiguration units 105b, . . . , and 105n are also extendedly connected in a manner that the serial bus date input signal and the serial bus data output between the adjacent blocks are cascaded.

Figure 4:
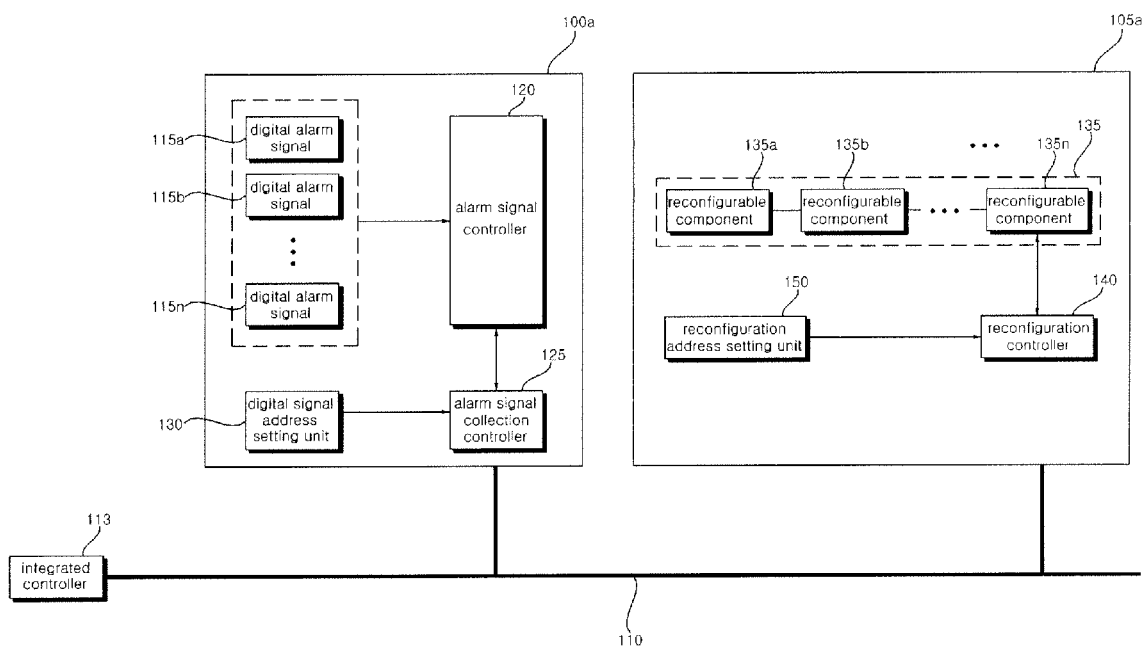
FIG. 4 shows a block-diagram which illustrates a unit of the constitution of FIG. 3.

FIG. 4 shows a block-diagram which illustrates the constitution of A in FIG. 3.

Referring to FIG. 4, the 1st to the nth digital alarm signals 115a, 115b, . . . , and 115n of the first alarm signal collecting unit 100a is gathered in an alarm signal gathering unit 120 of the first alarm signal collecting unit 100a.

An alarm signal collection controller 125 compares the addresses of the 1st to the nth alarm signal collecting units 100a, 100b, . . . , and 100n or reconfiguration units 105a, 105b, . . . , and 105n which are inputted through the serial bus 110 from the integrate controller 113 with the addresses of the first alarm signal collecting unit 100a inputted in alarm signal address setting unit 130, then in case it is decided that they are identical with each other, the 1st to the nth digital alarm signals 115a, 115b, . . . , and 115n gathered by the alarm signal gathering unit 120 are transmitted to the integrated controller 113 through the serial bus 110.

In case the addresses inputted through the serial bus 110 and the addresses of the first alarm signal collecting unit 110a are not decided to be identical with each other, the addresses inputted through the serial bus 110 are outputted, then the outputted addresses are inputted to the first reconfiguration unit 105a, where they are compared with the addresses which are inputted therein.

The integrated controller 113 informs alarm signal collecting unit 100a or reconfiguration unit 105a through the serial bus 110 of the addresses of the reconfiguration unit where the reconfigurable components exist which need reconfiguration.

A reconfiguration controller 140 of the first reconfiguration unit 105a compares the addresses of the reconfiguration address setting unit 150 where the addresses of the first reconfiguration unit 105a are inputted with the addresses inputted through the serial bus 110, then in case it is decided that they are identical with each other, the 1st to the nth reconfigurable components 135a, 135b, . . . , and 135n are connected with the serial bus 110.

The reconfigurable components are reconfigured in a manner that the reconfiguration data transmitted from the integrated controller 113 are transmitted to the 1st to the nth reconfigurable components 135a, 135b, . . . , and 135n in the first reconfiguration unit 105a.

After the 1st to the nth reconfigurable components 135a, 135b, . . . , and 135n are connected in series as shown in the figure, the 1st to the nth reconfigurable components 135a, 135b, . . . , and 135n are reconfigured, then the reconfiguration results are transmitted to the integrated controller 113 through the serial bus 110.

In case the addresses inputted through the serial bus 110 and the addresses of the first reconfiguration unit 105a are not decided to be identical with each other, the addresses inputted through the serial bus 110 are outputted, then the outputted addresses are inputted to the second alarm signal collecting unit 100b, where they are compared with the addresses which are inputted therein.

Figure 5:
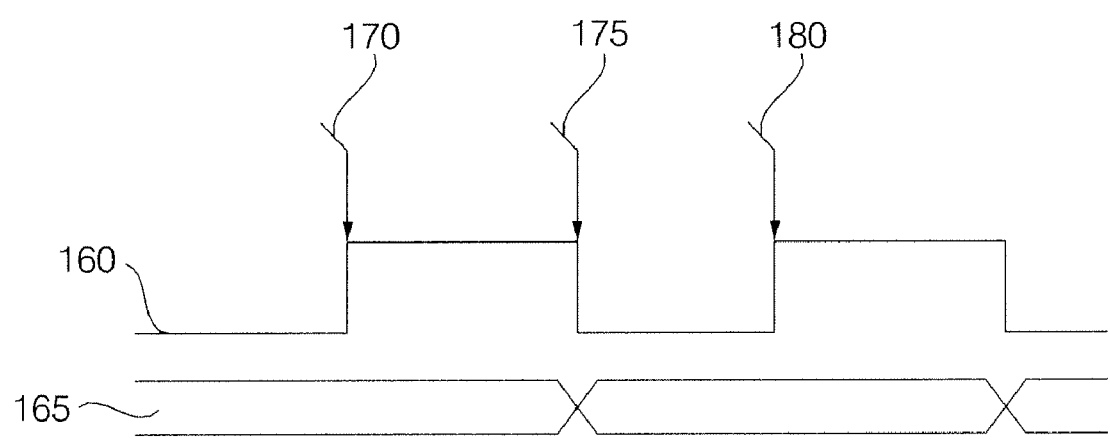
FIG. 5 illustrates the signal from the serial bus according to one embodiment of the present invention.

FIG. 5 illustrates the signal from the serial bus according to one embodiment of the present invention.

Referring to FIG. 5, the serial bus signal includes serial bus clock signal 160, serial bus data signal 165, and serial bus output data signal 175.

The serial bus clock signal 160 is used as basic operation clock of serial bus 110, that is to say, where the clock signal changes from 0 to 1, the serial bus input data signal 170 from the integrated controller 113 are inputted to the first alarm signal collecting unit 100a.

The serial bus input data signal 170 includes at least one of the addresses out of the 1st to the nth alarm signal collecting units 100a, 100b, . . . , and 100n and the 1st to the nth reconfiguration units 105a, 105b, . . . , and 105n.

Where the clock signal changes from 1 to 0, the data processing result from the 1st to the nth alarm signal collecting units 100a, 100b, . . . , and 100n or the 1st to the nth reconfiguration units 105a, 105b, . . . , and 105n whose address is identical with the input data is outputted to the integrated controller 113.

Further, the command or data which are received as the serial bus input data signal 165 are processed at the serial bus command execution time 180 which lags behind by 1 clock.

Meanwhile, in the serial bus connection, serial bus clock and word of command signal are shared, wherein the serial output data signal from the 1st alarm signal collecting unit 100a is cascaded to the serial output input signal of the 1st reconfiguration unit 105a, and thus it can be understood that the connection of the first serial bus can be simply extended. The 2nd reconfiguration unit 105b which is connected with the 2nd alarm signal collecting unit 100b and the 3rd alarm signal gathering unit 100c which is also connected in series with the 2nd alarm signal collecting unit 100b are desirably extendedly connected in a manner that the serial bus data input signal and the serial bus data output between the adjacent blocks are cascaded, and the serial bus clock and the word of command signal are shared.

Figure 6:
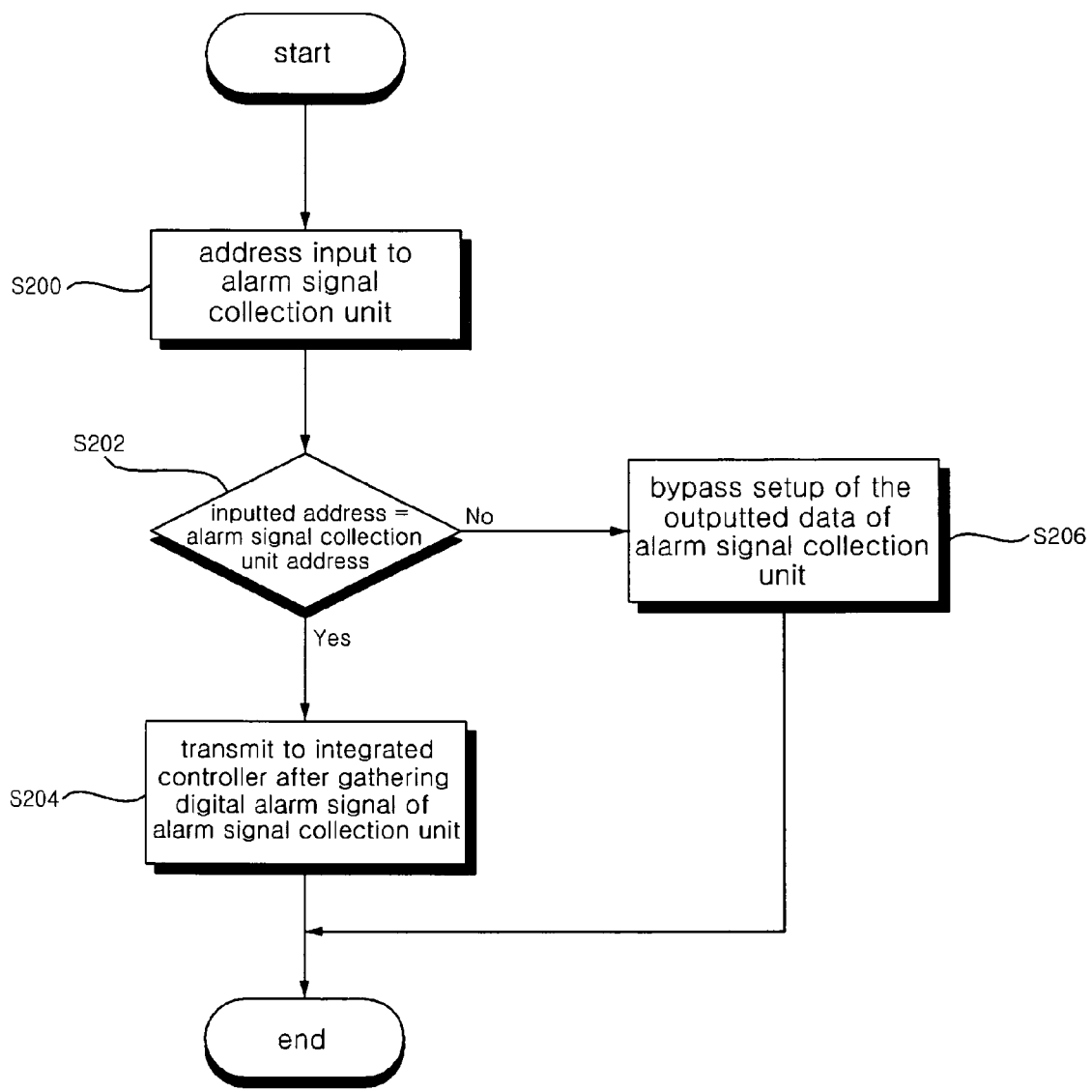
FIG. 6 shows a flow-chart which illustrates controlling method of the alarm signal collecting unit of the apparatus with reconfiguration function and signal gathering function using serial bus according to one embodiment of the present invention.

FIG. 6 shows a flow-chart which illustrates controlling method of the alarm signal collection unit of the apparatus with reconfiguration function and signal gathering function using serial bus according to one embodiment of the present invention.

Integrated controller 113 inputs the address of the alarm signal gathering unit or reconfiguration unit to the 1 st alarm signal collection unit 100a where the 1st to the nth digital alarm signals 115a, 115b, . . . , and 115n are gathered through serial bus 100 (S200).

When the address of the alarm signal gathering unit or reconfiguration unit is inputted to the 1st alarm signal collection unit 100a through the serial bus 110, the alarm signal gathering controller 125 compares the address inputted through the serial bus 110 and the address of the first alarm signal collection unit 100a (S202).

In case the inputted address turns out to be identical with the address of the first alarm signal gathering unit 100a after the comparison performed by the alarm signal collection controller 125, the 1st to the nth digital alarm signals 115a, 115b, . . . , and 115n which are gathered in the alarms signal gathering unit 120 of the first alarm signal collection unit 100a are transmitted to the integrated controller 113 through serial bus 110 (S204).

In case they are not decided to be identical with each other after the comparison performed by the alarm signal collection controller 125, the first alarm signal collection unit 100a does not operate, the inputted address is outputted and a bypass is set such that the outputted address is inputted to the 1st to the nth reconfiguration units 105a, 105b, . . . , and 105n which is positioned next to the first alarm signal collection unit 100a and the 2nd to the nth alarm signal collection units 100b, . . . , and 100n (S206).

Figure 7:
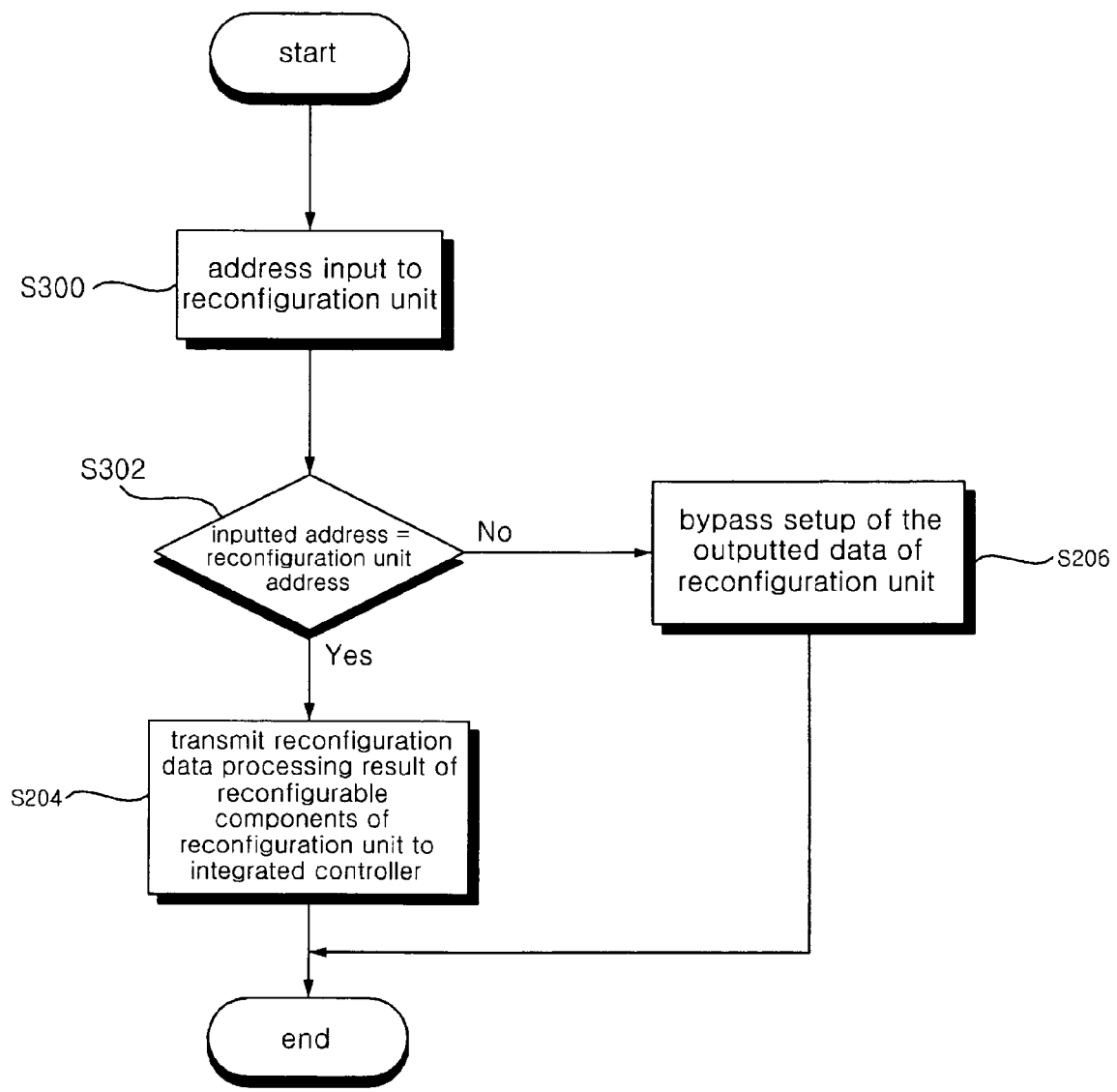
FIG. 7 shows a flow-chart which illustrates controlling method of the reconfiguration unit of the apparatus with reconfiguration function and signal gathering function using serial bus according to one embodiment of the present invention.

FIG. 7 shows a flow-chart which illustrates controlling method of the reconfiguration unit of the apparatus with reconfiguration function and signal gathering function using serial bus according to one embodiment of the present invention.

Referring to FIG. 7, in the integrated controller 113, in case the address of the first alarm signal collection unit 100a is not identical with the address of the alarm signal collection unit which is inputted to the first alarm signal collection unit 100a through the serial bus 100 or the reconfiguration unit, the outputted address which is bypassed form the fist alarm signal collection unit 100a is inputted to the first reconfiguration unit 105a (S300).

When the digital alarm signal address or reconfigurable component address is inputted to the first reconfiguration unit 105a through the serial bus 110, the reconfiguration controller 140 compares the inputted address with the address of the first reconfiguration unit 105a (S302).

In case the inputted the alarm signal collection unit address or the reconfiguration unit address turns out to be identical with the address of the first reconfiguration unit 105a after the comparison of the address in the reconfiguration controller 140, the 1st to the nth reconfiguration components 135a, 135b, . . . , and 135n of the first reconfiguration unit 105a are connected with the serial bus 110, then the 1st to the nth reconfiguration components 135a, 135b, . . . , and 135n undergoes reconfiguration data processing, and then the result of the processing is transmitted to the integrated controller 113 through the serial bus 110 (S304).

In case it is decided that the address of the first reconfiguration unit is not identical with the inputted alarm signal collection unit address or the reconfiguration unit address after the comparison performed by the reconfiguration unit 140, the first reconfiguration unit 105a does not operate, the inputted address is outputted and a bypass is setup such that the outputted address is inputted to the 2nd to the nth alarm signal collection units 100b, . . . , and 100n which is positioned next to the first reconfiguration unit 105a and the 2nd to the nth reconfiguration units 105b, . . . , and 105n (S306).

Therefore, in the apparatus with the reconfiguration function and signal gathering function in accordance with the present invention, address is allocated to the digital alarm signal collection blocks which for the checking-out of the state inside of the system and the reconfiguration unit of the reconfigurable components is connected by a single serial bus, and thus such desirably effect is gained as the number of the necessary components is decreased and the embodiment area is decreased.

Further, although the desirable embodiment of the present invention is illustrated and described in detail so far, the present invention is not limited to the described features, and is subject to various modifications by the ordinary-skilled person of the art within the scope of the present invention claimed by the attaché claims, and it should not be understood that these modifications is separated form the technical idea or prospect of the present invention.

What is claimed is:

1. An apparatus with reconfiguration function and signal gathering function comprising:
   a serial bus providing first address information, an alarm signal gathering unit configured to gather at least one digital alarm signal;

an alarm signal address setting unit configured to set up second address information of the alarm signal gathering unit; and an alarm signal collection controller coupled to said second bus, said alarm gathering unit and said alarm signal address setting unit, and configured to i) output the at least one digital alarm signal through the serial bus if the first address information which is inputted through the serial bus is identical to second address information which is set up in the alarm signal address setting unit, ii) output the first address information, to a reconfiguration unit if the first address information is not identical to the second address information.

2. An apparatus with reconfiguration function and signal gathering function comprising:

a reconfiguration address setting unit where at least one address of reconfigurable components is set up; and a reconfiguration controller which transmits reconfiguration data to the reconfigurable components through a serial bus and a reconfiguration processing result is outputted through the serial bus, if the first address information which is inputted through the serial bus is identical to second address information which is set up in the reconfiguration address setting unit, wherein the reconfiguration controller outputs the address information inputted through the serial bus, if the first address information is not identical to the second address information.

3. The apparatus with reconfiguration function and signal gathering function according to claim 2, wherein at least two reconfigurable components are connected in series.

4. An apparatus with reconfiguration function and signal gathering function which gathers and transmits at least one digital alarm signal comprising:

at least one alarm signal collection unit configured to collect the at least one digital alarm signal;

at least one reconfiguration unit connected with the alarm signal collection unit by a serial bus, and includes at least one reconfigurable component; and an integrated controller connected with the alarm signal collection unit and the reconfiguration unit by the serial bus, and outputs at least one address of the alarm signal collection unit and the reconfiguration unit through the serial bus so that the digital alarm signal of the alarm signal collection unit whose address is identical with the outputted address is inputted, or transmits the reconfiguration data from the reconfiguration unit to the at lease one reconfigurable component so that a reconfiguration processing result is inputted, wherein the alarm signal collection unit outputs the address inputted through the serial bus, if the first address and the second address are not identical to each other.

5. The apparatus with reconfiguration function and signal gathering function according to claim 4, wherein the alarm signal collection unit comprising, a digital alarm signal gathering unit which gathers at least one digital alarm signal, an alarm signal address setting unit where an address of the alarm signal gathering unit is set up, and an alarm signal collection controller which outputs at least one digital alarm signal through a serial bus, in case a first address inputted through the serial bus and a second address which is set up in the digital alarm signal address setting unit are identical with each other.

6. The apparatus with reconfiguration function and signal gathering function according to claim 5, wherein, the alarm signal collection unit outputs the address inputted through the serial bus, in case the first address and the second address are not identical with each other.

7. The apparatus with reconfiguration function and signal gathering function according to claim 5, wherein the reconfiguration unit comprising, a reconfiguration controller which compares the first address with the second address, and a reconfiguration address setting unit which sets up the second address.

8. The apparatus with reconfiguration function and signal gathering function according to claim 7, wherein the reconfiguration controller outputs the address inputted through the serial bus in case the first address and the second address are not identical with each other.

9. The apparatus with reconfiguration function and signal gathering function according to claim 4, wherein after the serial bus is connected with the reconfigurable components, reconfiguration data are transmitted to the reconfigurable components through the serial bus, thereby the reconfigurable components being reconfigured.

10. The apparatus with reconfiguration function and signal gathering function according to claim 4, wherein the at least one reconfigurable component is connected in series.

11. The apparatus with reconfiguration function and signal gathering function according to claim 4, wherein a plurality of the alarm signal collection units and the reconfiguration units are connected through the serial bus.

12. A controlling method of an apparatus with reconfiguration function and signal gathering function which gathers and transmits at least one digital alarm signal, the controlling method comprising;

a step where at least one address of an alarm signal collection unit and a reconfiguration unit is inputted through a serial bus;

a step where the inputted address is compared with an address of the alarm signal collection unit;

a step where at least one digital alarm signal of the alarm signal collection unit whose address is identical with the inputted address is outputted through the serial bus after the comparison; and a step wherein if the alarm signal collection unit address is not identical to the inputted address after the comparison, the inputted address is outputted through the serial bus.

13. The controlling method according to claim 12, further comprising:

a step where the address inputted through the serial bus is compared with the reconfiguration address; and a step where at least one reconfigurable component of the reconfiguration unit whose address is identical with the inputted address after the comparison undergoes reconfiguration data processing, so that a result is transmitted through the serial bus.

14. The controlling method according to claim 13, further comprising:

a step where the reconfiguration unit outputs the address inputted through the serial bus, in case the reconfiguration unit address is not identical with the inputted address after the comparison.

* * * * *